(12) United States Patent
Brass et al.

(10) Patent No.: US 8,516,439 B2
(45) Date of Patent: Aug. 20, 2013

(54) VISUALIZING OBJECT RELATIONSHIPS

(75) Inventors: Alasdair P. Brass, Portland, OR (US); Corvin F. Swick, White Salmon, WA (US); Daniel Lulich, Portland, OR (US)

(73) Assignee: iovation, Inc., Portland, OR (US)

( * ) Notice: Subject to any disclaimer, the term of this patent is extended or adjusted under 35 U.S.C. 154(b) by 1236 days.

(21) Appl. No.: 11/964,572

(22) Filed: Dec. 26, 2007

(65) Prior Publication Data

US 2008/0174603 A1 Jul. 24, 2008

Related U.S. Application Data

(60) Provisional application No. 60/882,115, filed on Dec. 27, 2006.

(51) Int. Cl.
*G06F 9/44* (2006.01)
(52) U.S. Cl.
USPC .......................................... 717/109; 717/105
(58) Field of Classification Search
USPC .................................................. 717/104–119
See application file for complete search history.

(56) References Cited

U.S. PATENT DOCUMENTS

| | | | |
|---|---|---|---|
| 5,903,478 A | 5/1999 | Fintel et al. | |
| 6,222,547 B1 | 4/2001 | Schwuttke et al. | |
| 6,569,205 B1 | 5/2003 | Poggi | |
| 6,868,525 B1 * | 3/2005 | Szabo | 715/738 |
| 7,310,780 B2 | 12/2007 | Diering et al. | |

OTHER PUBLICATIONS

Conti et al., "Visual Exploration of Malicious Network Objects Using Semantic Zoom, Interactive Encoding and Dynamic Queries", 2005, IEEE, pp. 83-90.*
Eric Pimpler, "Google Maps API—The New World of Web Mapping", Apr. 2006, Geospatial Training & Consulting, LLC, pp. 1-44.*
Livnat et al., "A Visualization Paradigm for Network Intrusion Detection", Jun. 2005, IEEE, pp. 30-37.*
Eick et al., "Visualizing Corporate Data", 1997, IEEE, pp. 6-11.*
Eick et al., "Visualizing Corporate Data", Jan. 1996, AT&T Technical Journal, pp. 1-25.*
International Search Report received in International Application No. PCT/US2007/026525, dated Nov. 30, 2009, 4 pages.

* cited by examiner

*Primary Examiner* — Ted T Vo
(74) *Attorney, Agent, or Firm* — Davis Wright Tremaine LLP; James S. Hsue; Heather M. Colburn

(57) ABSTRACT

Methods, apparatuses, and articles for enabling, by a computing device, provision of a visual manifestation of an object of interest and of one or more other objects related to the object of interest to a user of the computing device, are described herein. In various embodiments, the one or more other objects may be arranged in a manner conveying a degree of relationship, the visual manifestation further including a first indication of at least one exceptional relationship between any two objects or a second indication of a security status of one of the objects. Further, the computing device may facilitate the user in interacting with the visual manifestation, including altering or expanding the visual manifestation in response to a user interaction.

22 Claims, 4 Drawing Sheets

VISUALIZING OBJECT RELATIONSHIPS

RELATED APPLICATIONS

The present application claims priority to U.S. Provisional Application 60/882,115, entitled "Visualizing Object Relationship," filed on Dec. 27, 2006. The specification of the 60/882,115 provisional application is hereby incorporated by reference in its entirety for all purposes, except for those sections, if any, that are inconsistent with this specification.

FIELD OF THE INVENTION

The present invention relates to the field of data processing. More specifically, the present invention relates to the visualization of object relationships.

BACKGROUND OF THE INVENTION

Advances in microprocessor technologies have made computing ubiquitous. Advances in networking and telecommunication technologies have also made computing increasingly networked. Today, huge volumes of content and services are available through interconnected public and/or private networks.

At the same time, increasingly, data content and services are represented in the form of data objects, potentially having relationship with one another. Further, these relationships are often complex, and many applications, e.g. fraud detection, often require a user to understand these complex, intricate relationships between the objects.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF EMBODIMENTS OF THE INVENTION

Illustrative embodiments of the present invention include, but are not limited to, methods and apparatuses for enabling, by a computing device, provision of a visual manifestation of an object of interest and of one or more other objects related to the object of interest to a user of the computing device. In various embodiments, the one or more other objects may be arranged in a manner conveying a degree or a strength of relationship, the visual manifestation further including a first indication of at least one exceptional relationship between any two objects or a second indication of a security status of one of the objects. Further, the computing device may facilitate the user in interacting with the visual manifestation, including altering or expanding the visual manifestation in response to a user interaction.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Figure 1:
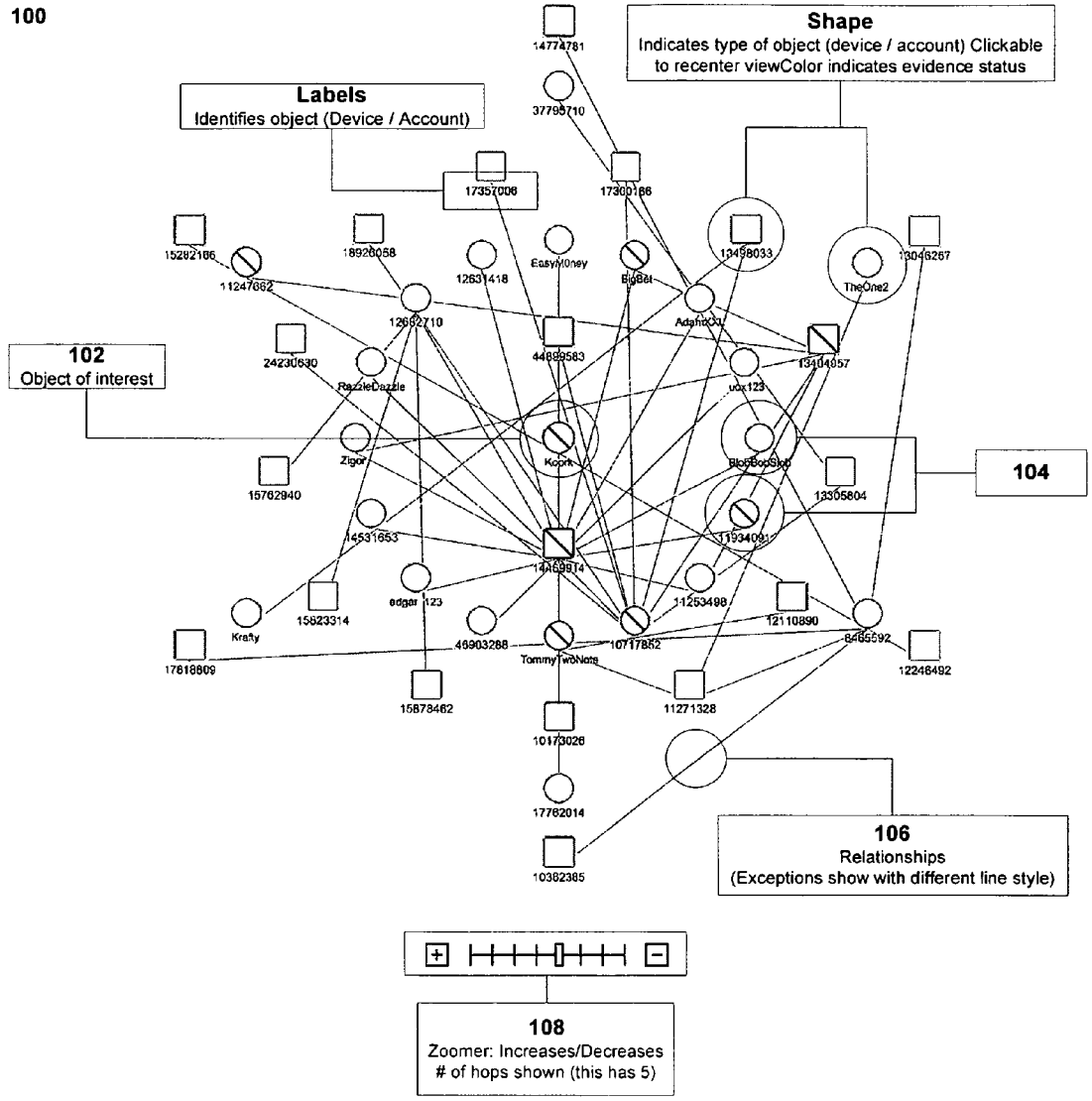
FIGS. 1-2 illustrate an overview of visualizing relationships between objects, in accordance with various embodiments.
Figure 2:
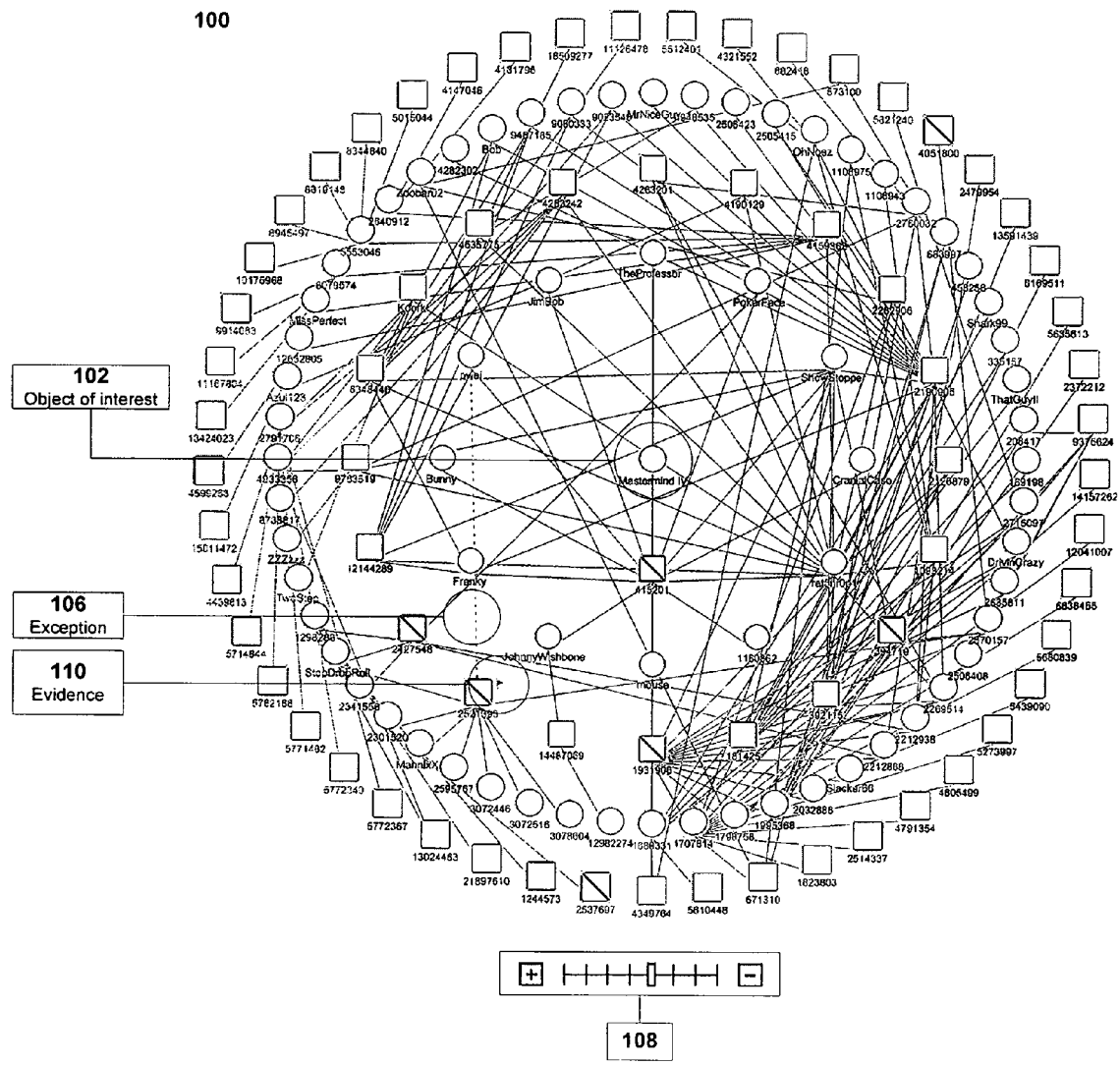

FIGS. 1-2 illustrate an overview of visualizing relationships between objects, in accordance with various embodiments. As illustrated, a computing device may be enabled to provide to a computing device user a visual manifestation 100 of an object of interest 102 and of one or more other objects 104 related to the object of interest 102. The other objects 104 in manifestations 100 may be arranged around the object of interest 102 in such a fashion as to convey a degree or a strength of relationship between each object 104 and the object of interest 102. In various embodiments, the visual manifestation 100 may further include a first indication 106 of at least one exceptional relationship between any two objects 102/104 (shown, for example, in FIG. 2 as a line between manifestations of objects 104) or a second indication 110 of a security status of one of the objects 102/104 (shown in FIG. 2 as a color of a manifestation of an object 104). In some embodiments, as shown in FIGS. 1 and 2, visual manifestation 100 may include a level-selecting user interface control 108 to enable the user viewing visual manifestation 100 to interact with manifestation 100 by adjusting a level, such as zooming in or out, effectively enabling the user to alter the degree or strength of relationship being visually manifested. Also, in various embodiments, the computing device rendering visual manifestation 100 may include logic (not shown), such as the instructions 422 illustrated by FIG. 4 to facilitate the computing device user in interacting with the visual manifestation 100, including altering or expanding the visual manifestation 100 in response to a user interaction. Further, in various embodiments, visual manifestation 100 may be two-dimensional or three dimensional.

Figure 4:
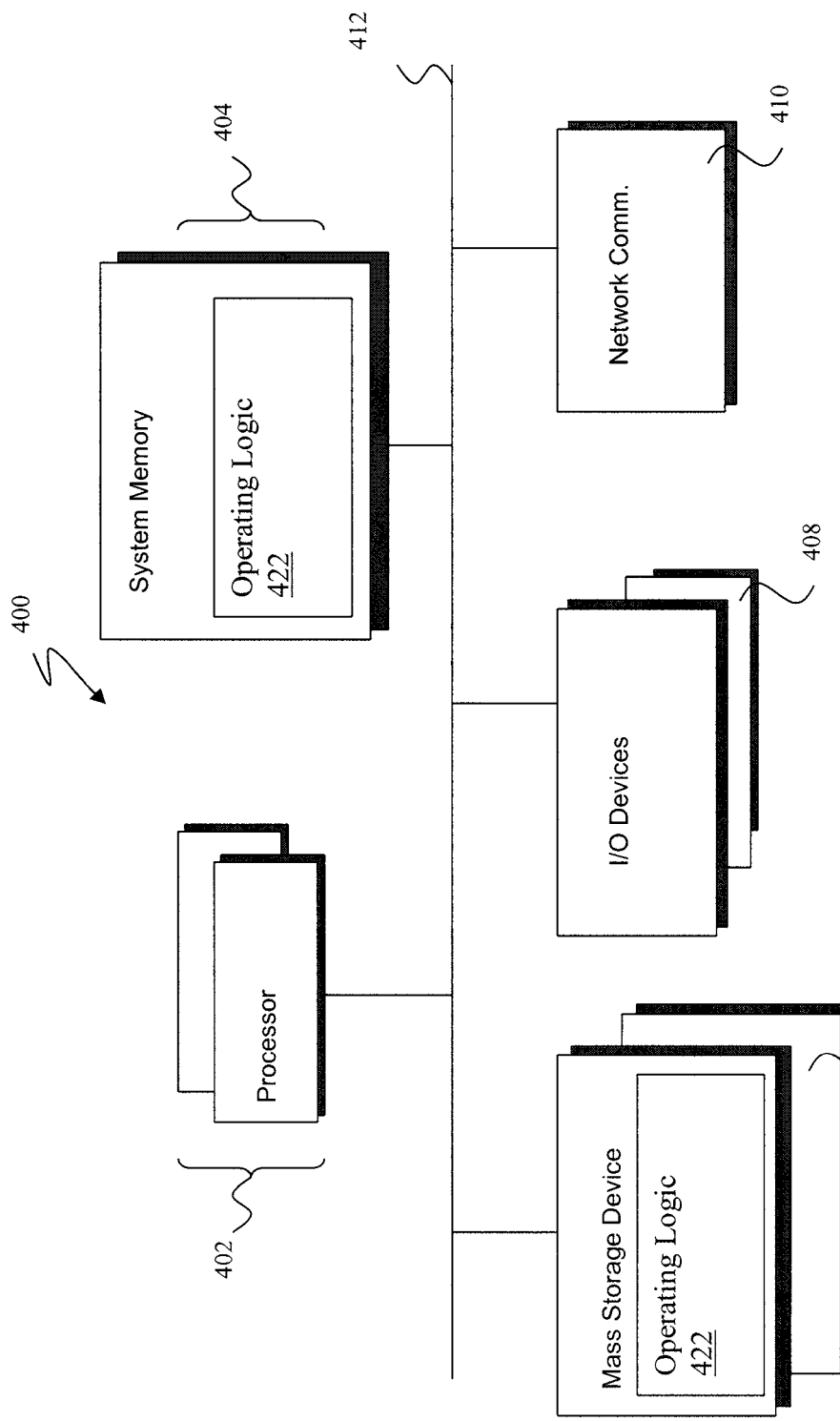
FIG. 4 is a block diagram illustrating an example computer system suitable for use to practice the present invention, in accordance with various embodiments.

In various embodiments, the computing device (not shown) configured to provide visual manifestation 100 and to facilitate interaction with visual manifestation 100 may be any sort of computing device known in the art, except for logic (not shown), such as instructions 422 (described in greater detail herein), and other logic adapted to perform the operations described more fully herein. The computing device may be a personal computer (PC), a workstation, a server, a router, a mainframe, a modular computer within a blade server or high-density server, a personal digital assistant (PDA), an entertainment center, a set-top box or a mobile device. An exemplary computing device is illustrated by FIG. 4, and will be described in greater detail herein.

In some embodiments, the computing device may be adapted to connect to a networking fabric and to receive visual manifestations 100, logic to enable the providing of the visual manifestations 100, and/or data to be used in generating the visual manifestations 100 from one or more other computing devices (not shown). Such a networking fabric may include one or more of a LAN, a WAN, and the Internet, as is known in the art. In one embodiment, the networking fabric may comprise a private network or a virtual private network (VPN) which may utilize tunneling.

In various embodiments, the computing device may render visual manifestation 100 to a user. Visual manifestation 100 may be an interactive network resource, such as a web page, to be displayed in a browser of the computing device, or may be a user interface of an application of the computing device. In one embodiment, the browser may include a plug-in such as a Flash player, to enable the rendering of visual manifestation 100. As mentioned, visual manifestation 100 may be received from another computing device or generated by the rendering computing device based on received data, such as a specification of a visual manifestation 100. The actual data represented by visual manifestation 100, such as the identities, relationships 106, and security statuses 110 of objects 102/104 may be obtained based on analyses performed by the computing device or another computing device.

In some embodiments, as illustrated, visual manifestation 100 may comprise an object of interest 102 surrounded by other related objects 104 arranged around the object of interest 102 in concentric rings, each ring corresponding to a degree or a strength of relationship, with the ring nearest to the object of interest 102 comprising objects 104 having direct relationships 106 to objects 104. In other embodiments, objects 104 and object of interest 102 may be arranged in spatial clouds representing relationship degree or strength as an axial distance. In one embodiment, a decision tree, rather than a concentric ring or a spatial cloud, may be used, the decision tree displaying relational data from left-to-right or top-down. In various embodiments, strength of relationship may be based on weighted aggregations of connectivity through multiple networks, alternative association tokens, frequency of appearance of an object 104, and/or age of an object 104. In some embodiments, relationships 106 between the objects 102/104 may be illustrated by lines 106 connecting the objects 102/104. And as shown in FIGS. 1 and 2, in various embodiments, only lines corresponding to "exceptional" relationships 106 (described below) may be rendered. In various embodiments, the manifested shape of each object 102/104 may indicate an object type or a specific security status 110. Also, in some embodiments, each object 102/104 may have a color, such as a reserved color, indicating its security status 110. Also, as mentioned above, visual manifestation 100 may include a level-selecting user interface control 108 to zoom in or out in terms of the degrees or strength of relationship manifested.

In various embodiments, object of interest 102 and objects 104 may be any sort of objects, such as computing devices, user accounts, services, applications, and/or networks. In one embodiment, each device may be associated with at least one identifier, such as a globally-unique identifier. Globally-unique identifiers are described in greater detail in U.S. patent application Ser. No. 11/923,572, entitled "Creating and Verifying Globally Unique Device-Specific Identifiers", filed on Oct. 24, 2007. The at least one identifier may also be any non-unique device identifier, such as a MAC address, or any sort of text string, such as a user name, an account name, etc.

As illustrated in FIGS. 1 and 2, each manifestation of an object 102/104 may have a shape, a color, and a label. In some embodiments, the label may correspond to the above-described identifier. The shape may be any sort of shape known in the art, such as squares, circles, triangles, etc. In some embodiments, each type of shape may correspond to a type of object. For example, a square may be associated with a computing device and a circle may be associated with a user account. In other embodiments, each type of shape may correspond to a security status 110 or a class of security statuses 110, the security status(es) 110 described in greater detail herein.

In various embodiments, the object of interest 102 may be selected prior to rendering visual manifestation 100 in response to a user query about object of interest 102. In other embodiments, object of interest 102 may be selected by the computing device based on one or more rules/policies, such as selecting an object 102 having the greatest number of indicia of fraud (in terms of the security status 110 of object 102, exceptional relationships 106 of object 102, security statuses 110 of related objects 104, etc.) by default. In further embodiments, an initial/default object of interest 102 may be selected at random. As described further herein, the object of interest 102 may be a shifting status to be exchanged among objects 104 in response to user interactions.

In some embodiments, a default number of degrees or default strength of relationship may be used initially for visual manifestation 110, and all objects 104 within that number of degrees or strength of relationship from the object of interest 102 may be manifested with object of interest 102. In response to either a change in that number of degrees or strength of relationship or in response to selection of a different object of interest 102, a new set of objects 104 may be manifested, the new set at least partially comprising the previous set of objects 104.

In various embodiments, as mentioned above, visual manifestation 100 may render lines to indicate relationships 106 between objects 102/104. Relationships 106 between objects 102/104 may be deemed "exceptional" or "normal", in some embodiments. A normal relationship 106 may be a relationship where neither of the object 102/104 parties is associated with fraudulent activity, and an exceptional relationship 106 may be a relationship where at least one of the object 102/104 parties is associated with fraudulent activity. In other embodiments, rather than indicating association with fraudulent activity, an exceptional relationship 106 may indicate a time period that an object 102/104 has been tracked without any negative evidence (i.e., evidence of fraud), a number of transactions an object 102/104 has entered into without any negative evidence, and/or a number of web-sites world-wide an object 102/104 has visited without incurring any negative evidence.

For example, the exceptional relationship 106 may be associated with information indicating fraud, a security exploit, or a suspect activity. In some embodiments, as mentioned above, only lines for exceptional relationships 106 may be rendered as part of visual manifestation 100. Lines corresponding to normal relationships 106 may not be rendered so as to make the visual manifestation more user friendly and less cluttered with visual cues. For example, a user may have two computing devices and a user account, and the user may log into that account from either or both devices. In such an example, each of the computing devices and user account are objects 102/104, and direct, normal relationships 106 may exist between each computing device and the account, and an indirect, normal relationship 106 may exist between the two computing devices (in this example, the devices would have a two degree relationship). If one of the computing devices was known to be involved in fraudulent activity, than any direct relationship 106 of that device would be an exceptional relationship 106.

In various embodiments, as previously mentioned, each object 102/104 may have a security status 110 (also referred to as "evidence" and "evidence status"), which may be represented by an object manifestation color, shape, or both. In some embodiments, an object 102/104 may have one of three colors, with a red color indicating that the object 102/104 is known to be involved in fraudulent activity, a yellow color indicating that the object 102/104 has a relationship 106 with an object 102/104 that is known to be involved in fraudulent activity, and a green color indicating that an object 102/104 has no association with fraudulent activity. In other embodiments, different colors and classifications may be used. In some other embodiments, a color and/or an object shape may indicate a specific type of fraudulent activity, such as phishing, with which an object 102/104 is associated. In one such embodiment, an object shape may be used to indicate a class of security status 110, and a color to indicate a specific activity within the class. In further embodiments, a color/shape may indicate a cumulative state for an object 102/104. For example, an object 102/104 may be represented by one shape once it has been found to have engaged directly in some particular fraudulent activity, such as identity theft. But when/if this same object is found to have also engaged in stolen credit cards, a new visual indicator may be used to reflect the accumulation of reputation. In one embodiment, a special shape/color (like a Skull and Crossbones) could be used to represent the absolute worst level of reputation.

As illustrated, visual manifestation 100 may include a level-selecting user interface control 108. The level-selecting user interface control 108 may be a slide bar, as shown in FIGS. 1 and 2, or may include radio buttons, a drop down list, a radial knob, or a spinner. The level-selecting user interface control 108 may be of an appearance as is often seen in interactive maps for zooming in and out of an image. As previously mentioned, the level-selecting user interface control 108 may enable the user, through user interaction, to control the number of degrees or strength of relationship from the object of interest 102 to be shown. For example, if the number is set at three, only objects 104 within three degrees from the object of interest 102 may be manifested. In one embodiment, moving an element of the level-selecting user interface control 108 in an upwards direction may reduce the number of degrees to two, and moving the element downwards may increase the number of degrees to four. In other embodiments, the effects of moving the element in those directions may be reversed. In some embodiments, rather than adjusting a number of degrees or a strength, the level-selecting user interface control 108 may affect the display such that only objects 104 submitted over the last week/month/quarter/year are displayed; only objects 104 submitted more than 'n' times are displayed; or only objects 104 that have been submitted by more the 'n' different data providers are displayed.

In various embodiments, as previously mentioned, the computing device may possess logic to facilitate a computing device user in interacting with the visual manifestation 100, including altering or expanding the visual manifestation 100 in response to a user interaction. Such user interactions may include facilitating the user in manipulating the level-selecting user interface control 108. As discussed previously, manipulation of the element of the level-selecting user interface control 108 may expand or reduce the number of objects 104 displayed in visual manifestation 100.

Also, as previously mentioned, the facilitating may comprise enabling the user to select one of the objects 104 as a new object of interest 102, and the altering or expanding may comprise refreshing the visual manifestation 100, using the new object of interest 102 in place of the previous object of interest 102. In one embodiment, the user may simply click, with a cursor, on an object 104 to set the object 104 as the new object of interest 102. In some embodiments, in response to the selection of the new object of interest 102, the computing device may retrieve further data about additional objects 104, their relationships 106, and their security statuses 110. In one embodiment, the new object 104 information may be used generating the refreshed visual manifestation 100.

Further, in some embodiments, the altering or expanding may comprise providing additional information about the exceptional relationship 106 or security status 110 of an object 102/104 in response to a user interaction with the object 102/104, the user interaction being, for example, a mouseover of the object 102/104. The additional information may comprise, for example, additional details about fraudulent activity the object 102/104 is known to be associated with. However, the additional information may be any sort of information pertaining to the object 102/104, in accordance with various embodiments.

Figure 3:
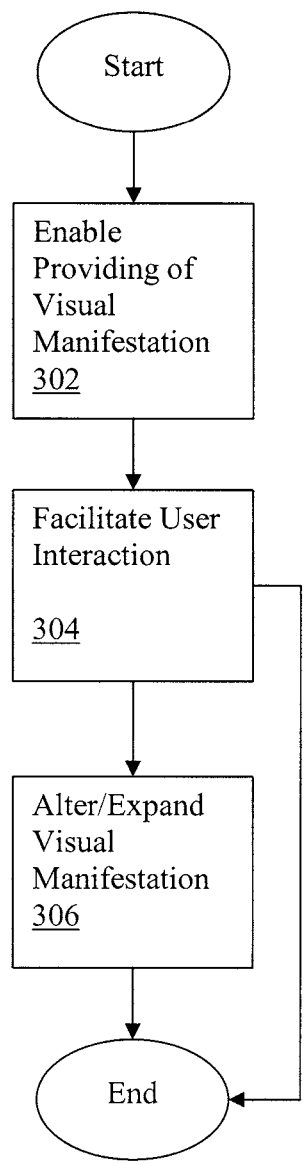
FIG. 3 illustrates a flowchart view of selected operations, in accordance with various embodiments.

FIG. 3 illustrates a flowchart view of selected operations, in accordance with various embodiments. As illustrated, a computing device may enable providing of a visual manifestation of an object of interest and of one or more other objects related to the object of interest to a user of the computing device, block 302, the one or more other objects arranged in a manner conveying a degree or a strength of relationship, the visual manifestation further including a first indication of at least one exceptional relationship between any two objects or a second indication of a security status of one of the objects. In some embodiments, each object may represent a computer system or a user account and is associated with globally-unique identifier. Also, the one or more other objects for each degree or strength of relationship may be displayed around the object of interest in a spatial cloud or a concentric ring representing relationship degree or strength as an axial distance.

In various embodiments, the first indication may comprise a line between two visual manifestations of objects and the second indication may comprise a reserved color. Further, the exceptional relationship may be associated with information indicating fraud, a security exploit, or a suspect activity, and the security status may indicate that the one the objects is known to be engaged in fraudulent activity, is known to be associated with another of the objects that is known to be engaged in fraudulent activity, or has no known association with fraudulent activity. In some embodiments, the second indication may comprise the reserved color and/or an object shape indicating a specific type of fraudulent activity with which the one of the objects is associated.

As is further illustrated, the computing device may then facilitate the user in interacting with the visual manifestation, block 304, including altering or expanding the visual manifestation in response to a user interaction, block 306. In some embodiments, the facilitating, block 304, may comprise providing the user with a level-selecting user interface control to enable the user to alter the degree or strength of relationship being visually manifested. In various embodiments, the facilitating, block 304, may comprise enabling the user to select one of the one or more other objects as a new object of interest, and the altering or expanding, block 306, may comprise refreshing the visual manifestation, using the new object of interest in place of the object of interest. In some embodiments, the altering or expanding, block 306, may comprise providing additional information about the exceptional relationship or security status in response to the user interaction, the user interaction being with the first indication or the second indication respectively.

FIG. 4 is a block diagram illustrating an example computer system suitable for use to practice the present invention, in accordance with various embodiments. As illustrated, computing system 400 includes one or more processors or processor cores 402, and system memory 404. For the purpose of this application, including the claims, the terms "processor" and "processor cores" may be considered synonymous, unless the context clearly requires otherwise. Additionally, computing system 400 includes mass storage devices 406 (such as diskette, hard drive, compact disc read only memory (CDROM) and so forth), input/output devices 408 (such as a display to render visual manifestation 100, a keyboard, a cursor control, and so forth) and communication interfaces 410 (such as network interface cards, modems and so forth). The elements are coupled to each other via system bus 412, which represents one or more buses. In the case of multiple buses, they are bridged by one or more bus bridges (not illustrated).

Each of these elements performs its conventional functions known in the art. In particular, system memory 404 and mass storage 406 may be employed to store a working copy and a permanent copy of the programming instructions implementing all or a portion of earlier described functions, herein collectively denoted as 422. The instructions 422 may be assembler instructions supported by processor(s) 402 or instructions that can be compiled from high level languages, such as C.

The permanent copy of the programming instructions may be placed into permanent storage 406 in the factory, or in the field, through, for example, a distribution medium (not shown), such as a compact disc (CD), or through communication interface 410 (from a distribution server (not shown)). That is, one or more distribution media having instructions 422 may be employed to distribute the instructions 422 and program various computing devices.

The constitution of these elements 402-412 are known, and accordingly will not be further described.

In embodiments of the present invention, an article of manufacture (not illustrated) may be employed to implement one or more methods as disclosed herein. For example, in exemplary embodiments, an article of manufacture may comprise a storage medium and a plurality of programming instructions stored in the storage medium and adapted to program computing device to configure the computing device to enable providing of a visual manifestation of an object of interest and of one or more other objects related to the object of interest to a user of the computing device, the one or more other objects arranged in a manner conveying a degree or a strength of relationship, the visual manifestation further including a first indication of at least one exceptional relationship between any two objects or a second indication of a security status of one of the objects. In various ones of these embodiments, programming instructions may be adapted to facilitate the user in interacting with the visual manifestation, including altering or expanding the visual manifestation in response to a user interaction.

Although specific embodiments have been illustrated and described herein, it will be appreciated by those of ordinary skill in the art that a wide variety of alternate and/or equivalent implementations may be substituted for the specific embodiments illustrated and described, without departing from the scope of the present invention. Those skilled in the art will readily appreciate that the present invention may be implemented in a very wide variety of embodiments or extended therefrom. This application is intended to cover any adaptations or variations of the embodiments discussed herein. Therefore, it is manifestly intended that this invention be limited only by the claims and the equivalents thereof.

What is claimed is:

1. A method for use with a plurality of objects each representing a particular computing device, a user account, a service, an application, or a network, a portion of the plurality of objects being associated with suspect or fraudulent activity, the method being performed by a computing device, the method comprising:

identifying, by the computing device, one of the plurality of objects an object of interest, others of the plurality of objects being related to the object of interest, others of the plurality of objects being related to the object of interest by a plurality of relationships, each relationship identifying a connection between one or plurality of relationships, each relationship identifying a connection between one of plurality of objects and another one of the plurality of objects, the plurality of relationships comprising one or more exceptional relationships and one or more normal relationships, each exceptional relationship being between a first one of plurality of objects and a second one of the plurality of objects wherein at least one of the first and second objects is associated with suspect or fraudulent activity, each normal relationship being between a third one of plurality of objects and a fourth one of the plurality of objects wherein neither the third object nor the fourth object is associated with suspect or fraudulent activity;

displaying, by the computing device, a visual representation of each of the plurality of objects within a visual manifestation;

displaying, by the computing device, a first indication within the visual manifestation for each of at least a portion of the one or more exceptional relationships;

receiving, by the computing device, a user interaction from a user; and in response to the user interaction, at least one of altering or expanding, by the computing device, the visual manifestation.

2. The method of claim 1, wherein each of the plurality of objects representing a particular computing device is associated with a globally-unique identifier, and the method further comprises:

for each of the plurality of objects that represents a particular computing device, displaying, by the computing device, the globally-unique identifier within the visual manifestation alongside the visual representation of the object.

3. The method of claim 1 for use with each of a portion of the plurality of objects being associated with a security status, the method further comprising:

displaying, by the computing device, a second indication within the visual manifestation indicating the security status associated with one of the plurality of objects, the first indication displayed for each of the portion of the one or more exceptional relationships comprising a line between the visual representations of the first object of the exceptional relationship and the second object of the exceptional relationship, and the second indication comprising a reserved color.

4. The method of claim 3, wherein the security status associated with each of the portion of the plurality of objects indicates that:

the object is known to be engaged in fraudulent activity;

the object is known to be free from fraudulent activity for a time period;

the object is known to be associated with another of the plurality of objects that is known to be engaged in fraudulent activity;

the object is known to be associated with another of the plurality of objects that is known to be free from fraudulent activity; or the object has no known association with fraudulent activity.

5. The method of claim 1 for use with each of a portion of the plurality of objects being associated with a security status, the method further comprising:

displaying, by the computing device, a second indication within the visual manifestation indicating the security status associated with a particular one of the plurality of objects, the second indication comprising a reserved color and/or an object shape indicating a specific type of fraudulent activity with which the particular object is associated or a cumulative state of the particular object.

6. The method of claim 1, wherein the visual representations of the others of the plurality of objects are arranged to convey a degree or a strength of a relationship with the object of interest, and the method further comprises:

providing the user with a level-selecting user interface control configured to enable the user to alter the degree or strength of the relationship being visually manifested, or to alter a selection of objects being visually manifested based on a recency of the objects being visually manifested, or a frequency of appearance or use of the objects being visually manifested.

7. The method of claim 1, wherein the object of interest is a first object of interest, and the method further comprises:

receiving a selection from the user of one of the plurality of other objects as a second object of interest; and refreshing the visual manifestation, using the second object of interest in place of the first object of interest.

8. The method of claim 1 for use with each of a portion of the plurality of objects being associated with a security status, the method further comprising:

displaying, by the computing device, a second indication within the visual manifestation indicating the security status associated with one of the plurality of objects, wherein if the user interaction is with the first indication for selected exceptional relationship, altering or expanding the visual manifestation comprises providing additional information about the selected exceptional relationship in response to the user interaction, and if the user interaction is with the second indication, altering or expanding the visual manifestation comprises providing additional information about the security status in response to the user interaction.

9. The method of claim 1, wherein the visual representations of the others of the plurality of objects are displayed around the visual representation of the object of interest in a spatial cloud, a concentric ring, or a decision tree in which axial distance represents relationship degree or relationship strength with respect to the object of interest.

10. The method of claim 1, further comprising:

displaying, by the computing device, a second indication in the visual manifestation indicating a security status associated with one of the plurality of objects.

11. The method of claim 1, further comprising:

displaying, by the computing device, a second indication within the visual manifestation for each of a portion of the one or more normal relationships, the second indication being different from the first indication.

12. The method of claim 1, wherein if the user interaction is with the first indication for a selected exceptional relationship, altering or expanding the visual manifestation comprises providing additional information about the selected exceptional relationship in response to the user interaction.

13. A computing device comprising:

(a) a processor; and (b) logic to be operated by the processor, the logic being configured to:

identify a plurality of objects each representing a particular computing device, a user account, a service, an application, or a network;

identify ones of the plurality of objects associated with suspect or fraudulent activity;

identify one of the plurality of objects as an object of interest, others of the plurality of objects being related to the object of interest by a plurality of relationships, each relationship identifying a connection between one of plurality of objects and another one of the plurality of objects, the plurality of relationships comprising one or more exceptional relationships and one or more normal relationships, each exceptional relationship being between a first one of plurality of objects and a second one of the plurality of objects wherein at least one of the first and second objects is associated with suspect or fraudulent activity, each normal relationship being between a third one of plurality of objects and a fourth one of the plurality of objects wherein neither the third object nor the fourth object is associated with suspect or fraudulent activity;

display a visual representation of each of the plurality of objects within a visual manifestation;

display a first indication within the visual manifestation for each of at least a portion of the one or more exceptional relationship;

receive a user interaction from the user; and in response to the user interaction, at least one of alter or expand the visual manifestation.

14. The computing device of claim 13, wherein each of the plurality of objects that represents a particular computing device or user account is associated with a globally-unique identifier, and the logic is further configured to display the globally-unique identifier within the visual manifestation alongside the visual representation of the object associated with the globally-unique identifier.

15. The computing device of claim 13, wherein the logic is further configured to display a second indication indicating of a security status of one of the plurality of objects, the first indication displayed for each of the portion of the one or more exceptional relationships comprises a line between the visual representations of the first object of the exceptional relationship and the second object of the exceptional relationship, and the second indication comprises a reserved color.

16. The computing device of claim 13, wherein the visual representations of the others of the plurality of objects are arranged to convey a degree or a strength of a relationship with the object of interest, and the logic is further configured to provide the user with a level-selecting user interface control to enable the user to alter the degree or strength of the relationship being visually manifested or to alter a selection of objects being visually manifested based on a recency of the objects being visually manifested, or a frequency of appearance or use of the objects being visually manifested.

17. The computing device of claim 13, wherein the object of interest is a first object of interest, and the logic is further configured to:
   receiving a selection from the user of one of the plurality of other objects as a second object of interest, and
   refresh the visual manifestation, using the second object of interest in place of the first object of interest.

18. An article of manufacture comprising:
   (a) a storage medium; and
   (b) a plurality of programming instructions stored on the storage medium and configured to program a computing device to
      identify a plurality of objects each representing a particular computing device, a user account, a service, an application, or a network;
      identify ones of the plurality of objects associated with suspect of fraudulent activity;
      identify one of the plurality of objects as an object of interest, others of the plurality of objects being related to the object of interest by a plurality of relationships, each relationship identifying a connection between one of plurality of objects and another one of the plurality of objects, the plurality of relationships comprising one or more exceptional relationships and one or more normal relationships, each exceptional relationship being between a first one of plurality of objects and a second one of the plurality of objects wherein at least one of the first and second objects is associated with suspect or fraudulent activity, each normal relationship being between a third one of plurality of objects and a fourth one of the plurality of objects wherein neither the third object nor the fourth object is associated with suspect or fraudulent activity;
      display a visual representation of each of the plurality of objects within a visual manifestation;
      display a first indication within the visual manifestation for each of at least a portion of the one or more exceptional relationships;
      receive a user interaction from the user; and
      in response to the user interaction, at least one of alter or expand the visual manifestation.

19. The article of claim 18, wherein each of the plurality objects that represents a particular computing device or user account is associated with a globally-unique identifier, and the plurality of programming instructions further program the computing device to display the globally-unique identifier within the visual manifestation alongside the visual representation of the object associated with the globally-unique identifier.

20. The article of claim 18, wherein the the plurally of programming instruction further program the computing device to display a second indication indicating of a security status of one of the plurality of objects,
   the first indication displayed for each of the portion of the one or more exceptional relationships comprises a line between the visual representations of the first object of the exceptional relationship and the second object of the exceptional relationship, and
   the second indication comprises a reserved color.

21. The article of claim 18, wherein the visual representations of the others of the plurality of objects are arranged to convey a degree or a strength of a relationship with the object of interest, and
   the programming instructions are further configured to provide the user with a level-selecting user interface control to enable the user to alter the degree or strength of the relationship being visually manifested or to alter a selection of objects being visually manifested based on a recency of the objects being visually manifested, or a frequency of appearance or use of the objects being visually manifested.

22. The article of claim 18, wherein the object of interest is a first object of interest, and
   the programming instructions are further configured to
   receiving a selection from the user of one of the plurality of other objects as a second object of interest, and
   refresh the visual manifestation, using the second object of interest in place of the first object of interest.

* * * * *